(12) United States Patent
Ziegmann (10) Patent No.: US 11,129,376 B2
(45) Date of Patent: Sep. 28, 2021

(54) ANIMAL TRAP WITH THREE WAY TRIGGER

(71) Applicant: N.P.Z., Inc., Lake View, IA (US)

(72) Inventor: Neil Ziegmann, Lake View, IA (US)

(73) Assignee: N.P.Z., Inc., Lake View, IA (US)

( * ) Notice: Subject to any disclaimer, the term of this patent is extended or adjusted under 35 U.S.C. 154(b) by 481 days.

(21) Appl. No.: 16/009,522

(22) Filed: Jun. 15, 2018

(65) Prior Publication Data

US 2018/0360021 A1 Dec. 20, 2018

Related U.S. Application Data

(60) Provisional application No. 62/520,635, filed on Jun. 16, 2017.

(51) Int. Cl.
*A01M 23/02* (2006.01)
*A01M 23/20* (2006.01)
*A01M 23/18* (2006.01)

(52) U.S. Cl.
CPC ............ *A01M 23/02* (2013.01); *A01M 23/18* (2013.01); *A01M 23/20* (2013.01)

(58) Field of Classification Search
CPC ...... A01M 23/02; A01M 23/18; A01M 23/20; A01M 23/16; A01M 23/08; A01M 23/00
USPC ............................... 43/60, 61, 64, 65, 67, 58
See application file for complete search history.

(56) References Cited

U.S. PATENT DOCUMENTS 2,574,780 A * 11/1951 Giacoletto ............ A01M 23/20
43/61
4,706,406 A * 11/1987 Mowatt ................. A01M 23/18
43/60
8,230,641 B2   7/2012 Rich et al.
8,418,396 B2 *  4/2013 Moustirats .......... A01M 31/002
43/61
9,204,627 B1 * 12/2015 Comstock ............. A01M 23/18
(Continued)

FOREIGN PATENT DOCUMENTS

DE           9318990 U1 *  3/1994  ............ A01M 23/18

OTHER PUBLICATIONS

"Advanced Trap Home", http://trappintales.com/AT/?v=400b9d48e62, pp. 1-6. Jun. 29, 2016.
(Continued)

*Primary Examiner* — Darren W Ark
*Assistant Examiner* — Katelyn T Truong
(74) *Attorney, Agent, or Firm* — McKee, Voorhees & Sease, PLC (57) ABSTRACT

A trap for capturing small animals, such as raccoons, includes a housing with front and rear doors, and a three-way trigger which is actuated by an animal trying to reach bait located in the housing and behind the trigger. The trigger can be moved longitudinally forward to a set position which holds the door open to release the door to a closed position. The trigger can be actuated or tripped in either left or right lateral directions, or in a rearward longitudinal direction to release the door to a closed position. The trigger is spring biased toward the set position. The front door slides vertically within guide tracks extending along opposite lateral edges of the front door, or alternatively, is hinged for pivotal movement. The back door can be opened for positioning bait inside the housing.

15 Claims, 9 Drawing Sheets

(56) References Cited

U.S. PATENT DOCUMENTS

| | | | |
|---|---|---|---|
| 2005/0097808 A1* | 5/2005 | Vorhies | A01M 23/20 43/61 |
| 2008/0178516 A1* | 7/2008 | Hall | A01M 23/20 43/61 |
| 2009/0094882 A1 | 4/2009 | Comstock | |
| 2010/0242338 A1* | 9/2010 | Facklam | A01M 23/20 43/61 |
| 2013/0025182 A1* | 1/2013 | DeKalb | A01M 23/20 43/61 |
| 2016/0073624 A1* | 3/2016 | Ha | A01M 23/20 43/61 |
| 2017/0000105 A1* | 1/2017 | Ziegmann | A01M 23/08 |

OTHER PUBLICATIONS

Comstock Double Door Beaver/Raccoon Cage, http://comstockcustomcage.com/shop/beaverotter/comstock-double-door-beaverraccoon-cage, pp. 1-3. Jun. 29, 2016.
"Raccoon Traps", Havahart, http://www.havahart.com/store/animal-traps/raccoons, pp. 1-5. Jun. 29, 2016.
Wickenkamp Raccoon Trap Wildlife Control Supplies, http://www.wildlifecontrolsupplies.com/animal/WICK/NWS121030.html, pp. 1-2. Jun. 29, 2016.

* cited by examiner

ANIMAL TRAP WITH THREE WAY TRIGGER

CROSS-REFERENCE TO RELATED APPLICATIONS

This application claims priority to Provisional Application U.S. Ser. No. 62/520,635, filed Jun. 16, 2017, which is herein incorporated by reference in its entirety.

FIELD OF THE INVENTION

The invention is directed toward a live animal trap having a trigger which can be actuated in three directions for capturing an animal, such as a raccoon.

BACKGROUND OF THE INVENTION

Live animal traps of many styles are well-known in the industry. Conventional traps generally include a housing, cage or tube with one or more doors, including a door on the front end through which the prey can enter when seeking a food bait located towards the rear of the trap. In a conventional trap, one common trigger is a pivotal floor pan which rocks fore and aft as the animal walks over the pan. Movement of the pan by the animal causes the door to close, thereby trapping the animal inside the housing. Another type of trigger is a one-way trigger extending downwardly from the top of the trap and actuated by the animal moving through the open door and rearwardly into contact with the trigger to access the bait. When the trigger is pushed back by the animal, the door is released from the open position and moves to a closed and locked position to trap the animal inside the housing, cage, or tube. However, with both types of triggers, sometimes the animal can get past the trigger without actuation, get the bait, and then escape, without the door being tripped to close.

More recently, traps having two-way triggers have become commercially available. The two-way trigger can be actuated in opposite forward and rearward directions by the animal, such that if the animal gets past the trigger when going for the bait, the animal will more likely trip the trigger in a forward direction when trying to exit the trap. Thus, the two-way trigger is an improvement over the one-way trigger. However, animal sometimes get into and out of a trap without actuating a two-way trigger, such as a smaller animal that does not push or pull the trigger fore and aft. Therefore, there is a need for further improvements to a live animal trap to assure capture of an animal, such as a skunk, raccoon, rat, or any other desired animal.

Accordingly, a primary objective of the present invention is a provision of a live animal trap with a three-way trigger.

Another objective of the present invention is a provision of an animal trap having a trigger that can be tripped by movement about a lateral axis and a longitudinal axis as a sliding or hinged door.

A further objective of the present invention is a provision of an animal trap having a trigger which can be tripped by an animal who moves the trigger rearward or laterally.

Still another objective of the present invention is the provision of a live animal trap which increases the likelihood that an animal will be caught.

Yet another objective of the present invention is the provision of an animal trap having a spring biased trigger.

Another objective of the present invention of the provision of a live animal trap having a door which slides vertically upwardly and downwardly between open and closed positions within guide tracks on opposite edges of the door, or alternatively, has a hinged door which pivots about a horizontal axis.

A further objective of the present invention is a provision of a live animal trap having a trigger with a pair of diverging fingers extending downwardly inside the housing of the trap.

Another objective of the present invention the provision of a live animal trap having a rear door which can be opened to place bait inside the trap behind the trigger.

Still another objective of the present invention is a provision of an animal trap which is easy and safe to set, and effective in use.

These and other objectives will become apparent from the following description of the invention.

SUMMARY OF THE INVENTION

A live animal trap has a housing defining a compartment with opposite lateral sidewalls, a top wall, and a bottom wall. A front and rear door are provided at each end of the housing, each being movable between open and closed positions. The front door slides upwardly and downwardly within tracks secured at the front end of the housing, or alternatively, is hinged at its upper edge for pivotal movement between the open and closed positions. The rear door is attached to the rear end of the housing. A trigger can be moved from a set position to hold the front door open and a tripped position to allow the front door to close. The trigger can be actuated by the animal by moving the trigger rearwardly or in opposite lateral directions. The three-way trigger virtually eliminates the chance for an animal to get the bait behind the trigger and then escape the trap.

DESCRIPTION OF THE INVENTION

A first embodiment of the animal trap of the present invention is generally designated by the reference numeral 10 in FIGS. 1-12. The trap 10 is intended to capture animals, such as skunks, raccoons, possums, and other fur bearing or nuisance animals in a live condition for release or other uses.

The trap 10 includes a housing 12, which may be in the form of a tube, a cage, or other structure which forms a compartment for containing the animal. The Figures show a cylindrical tubular housing 12, though other shapes may be utilized. For example, the compartment may be round, square, rectangular, or triangular in cross section. The housing 12 includes and opposite front and rear-ends. A front door 16 is mounted on the front of the housing 12 and a rear door 18 is mounted on the rear of the housing 12. In the preferred embodiment, the front door 16 is a guillotine type door, slidably mounted on a pair of tracks 20 for movement between a raised, open position and a lowered, closed position. In a preferred embodiment, the rear door 18 is pivotably mounted to the housing 12 on hinges 22 so as to be moveable between opened and closed positions. It is understood that the rear door can alternatively be slidable rather than hinged.

Figure 6:
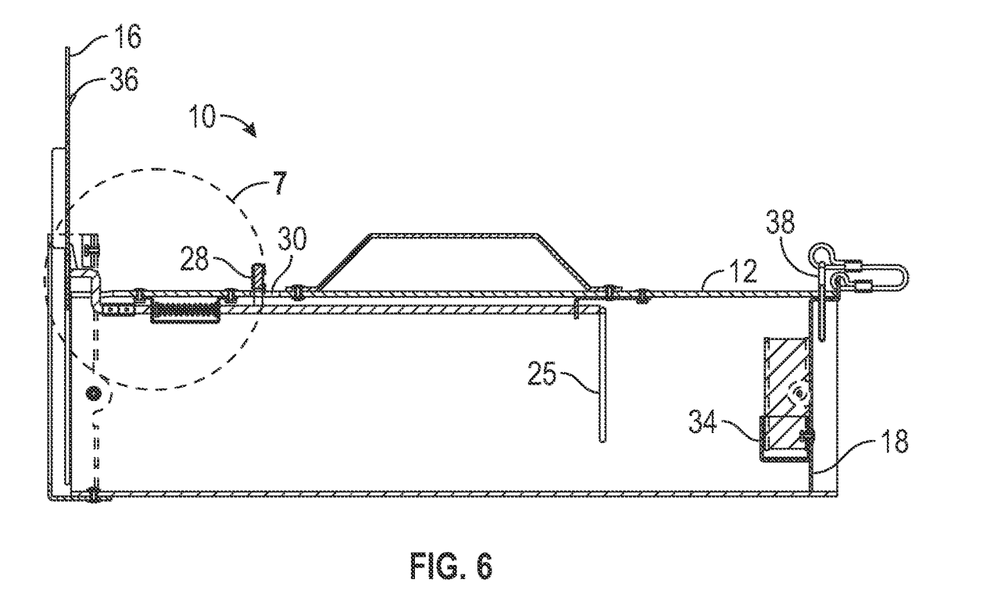
FIG. 6 is a sectional view taken along line 6-6 of FIG. 3.
Figure 11:
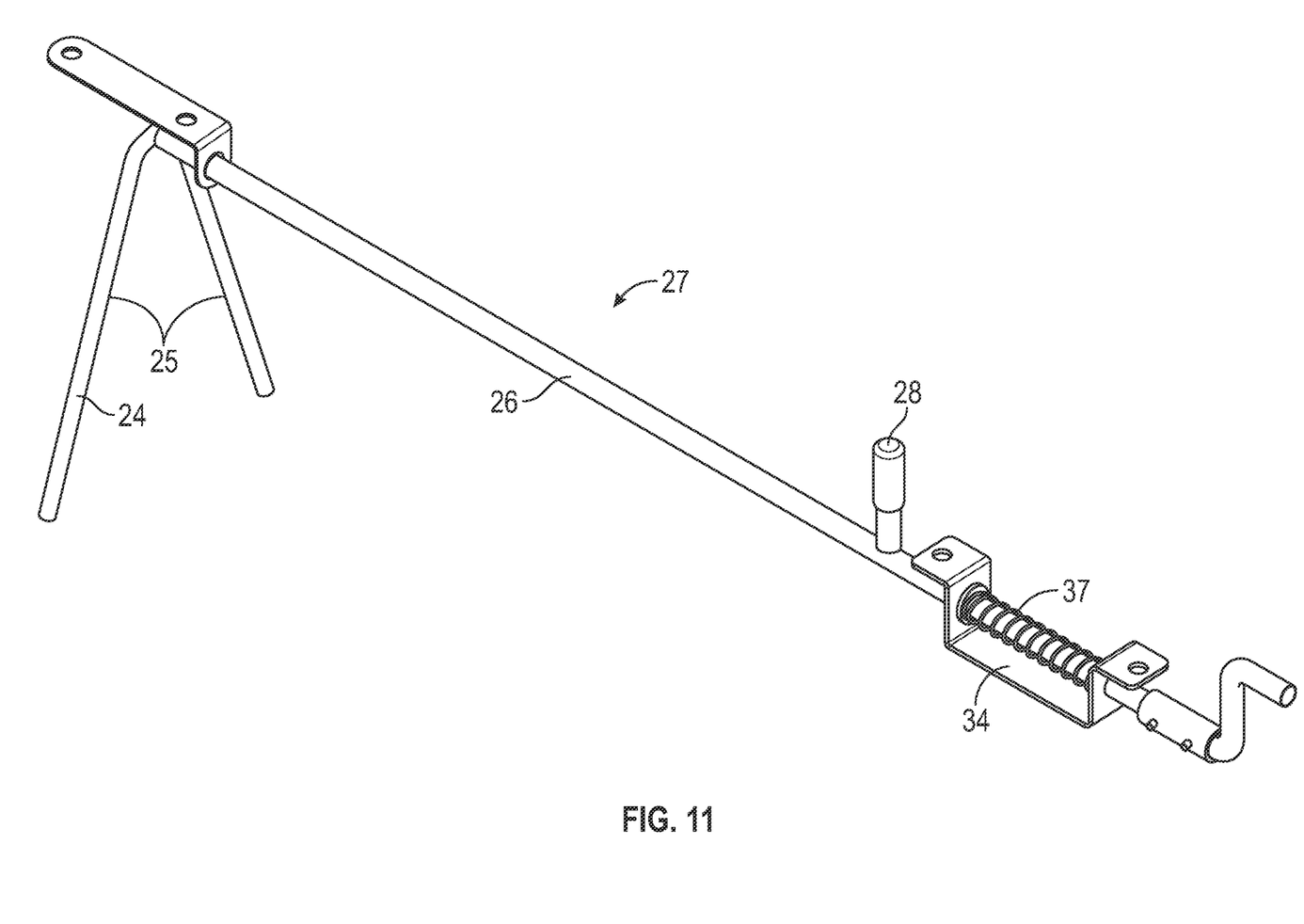
FIG. 11 is a perspective view of the linkage assembly for the trap trigger of the first embodiment.
Figure 12:
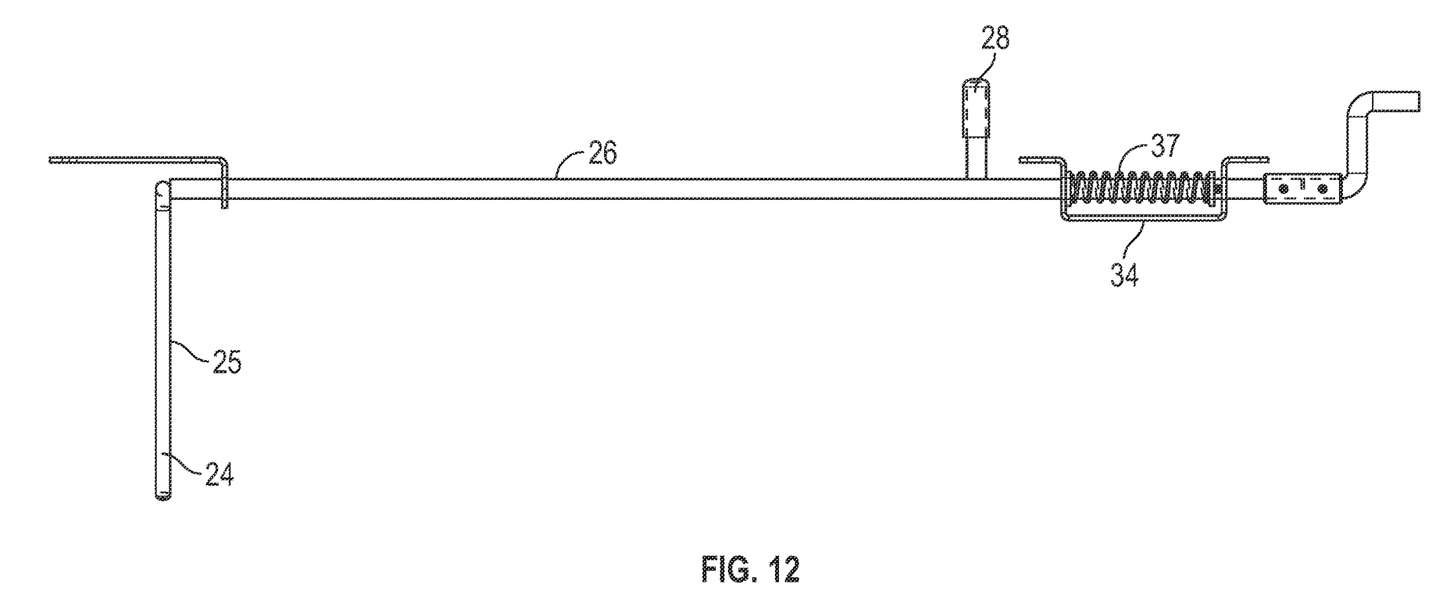
FIG. 12 is a side elevation view of the linkage assembly of the first embodiment.

The trap 10 includes a trigger 24 mounted on an elongated rod 26 extending longitudinally within the housing 12 adjacent the top of the housing. The trigger 24 extends downwardly inside the housing 12, and may have any shape, such as a pair of diverging arms 25. The trigger 24 may have more or less arms or fingers and different configurations than the V-shaped arms 25 shown in the drawings. The rod 26 is slidably mounted to the housing for movement forwardly and rearwardly, and is spring biased to a forward position. The trigger 24 includes a finger 28 extending through a slot 30 in the top of the housing 12. The trigger 24 and rod 26 form a linkage assembly 27 which can be mounted as a unit to the housing.

Figure 10:
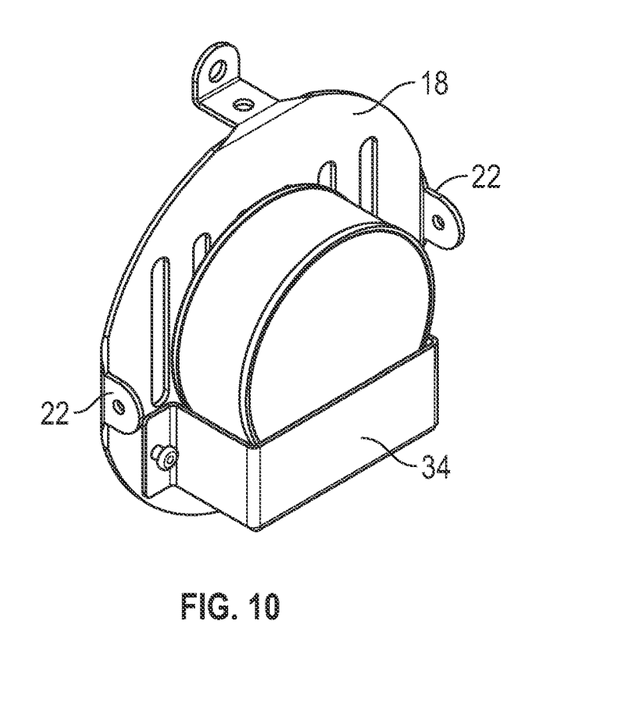
FIG. 10 is a perspective view of the back door of the trap of the first embodiment.

When the front door 16 is in the raised position, the trap 10 can be set by pushing or pulling the finger 28 forwardly so that the forward end of the rod 26 engages a catch 32 on the inside of the door 16, so as to retain the door 16 in the opened position. Before setting the trap 10, bait can be inserted into the housing 12 rearward of the trigger 24. For example, bait can be inserted through the open front or rear ends of the housing 12 when the front or rear door is opened. In the preferred embodiment shown in the photographs, the rear door 18 has a shelf or pocket 34 mounted or otherwise attached on the inside of the door and adapted to hold the bait when the rear door 18 is pivoted closed.

Figure 1:
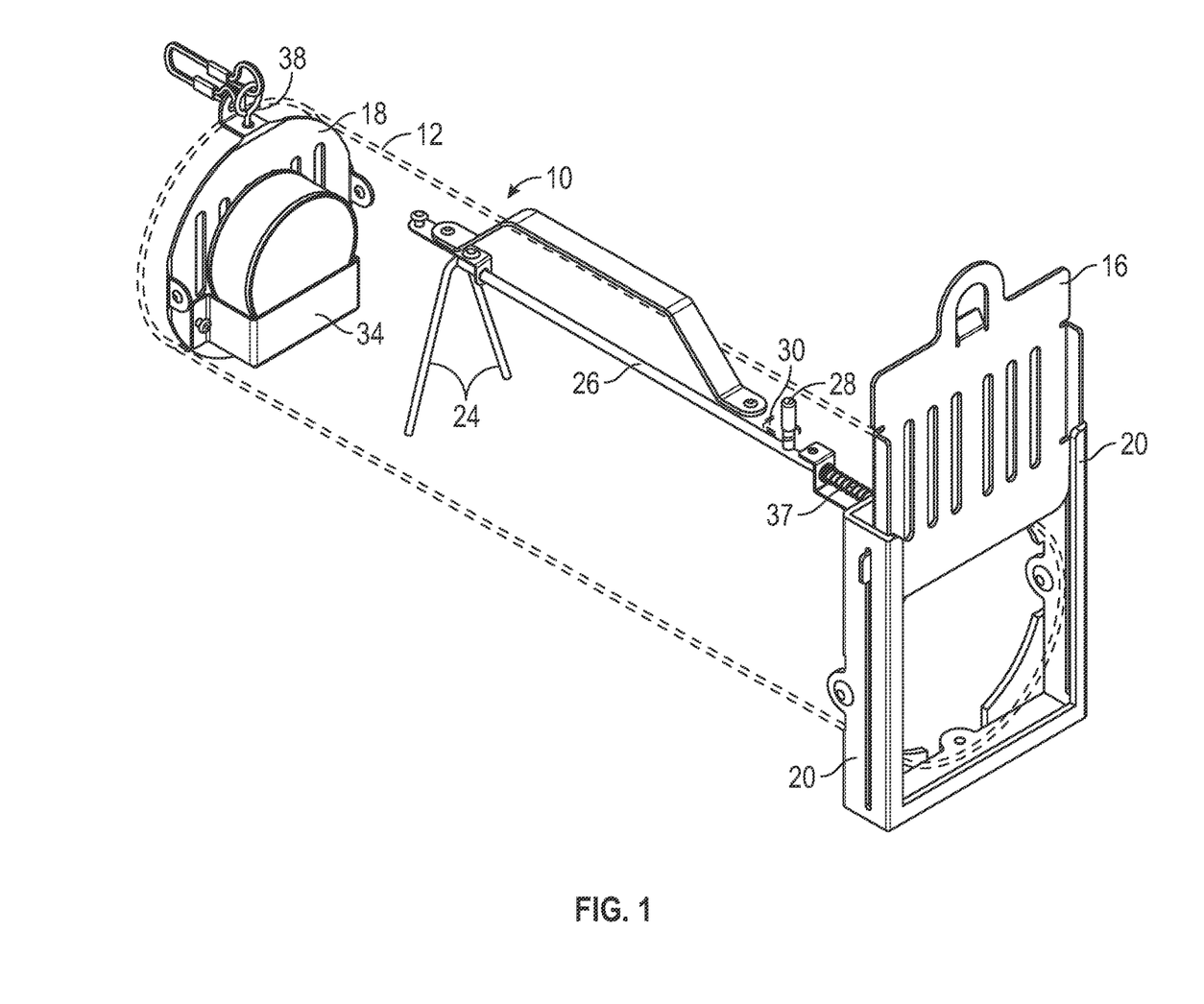
FIG. 1 is a perspective view of a first embodiment of the animal trap of the present invention, with the front door in an open position.
Figure 2:
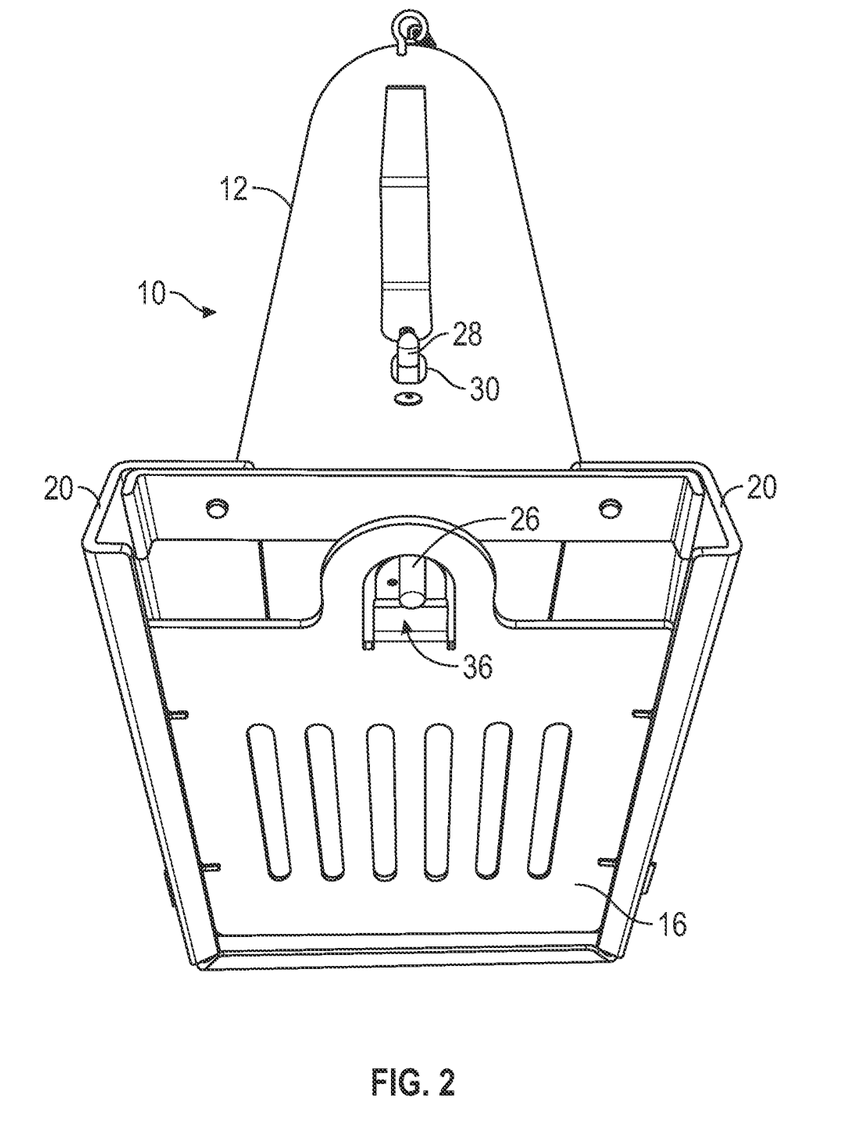
FIG. 2 is another perspective view of the animal trap of FIG. 1, with the front door in the closed position.
Figure 3:
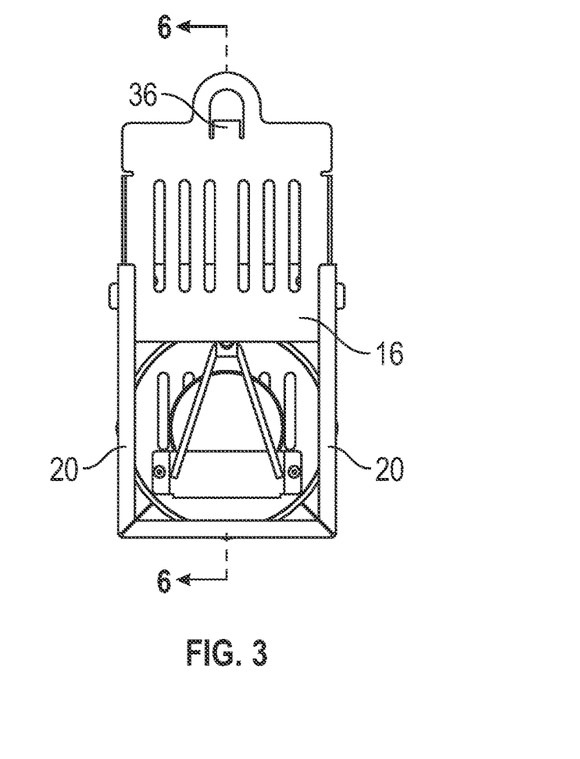
FIG. 3 is a front elevation view of the trap of FIG. 1, with the sliding front door open.
Figure 4:
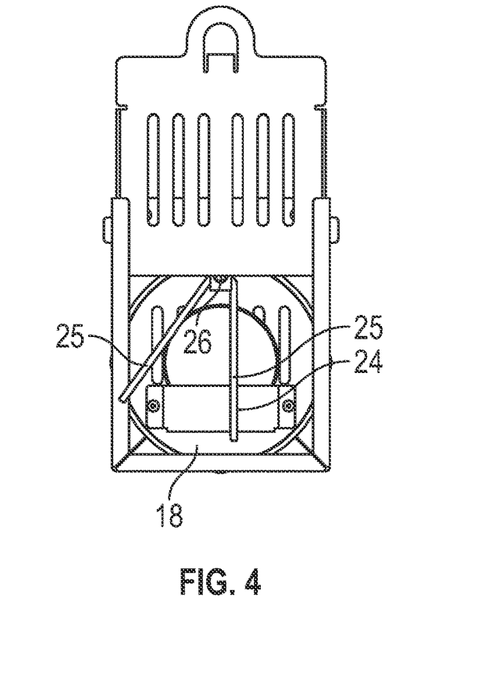
FIG. 4 is a view similar to FIG. 3, with the trigger moved to the right.
Figure 5:
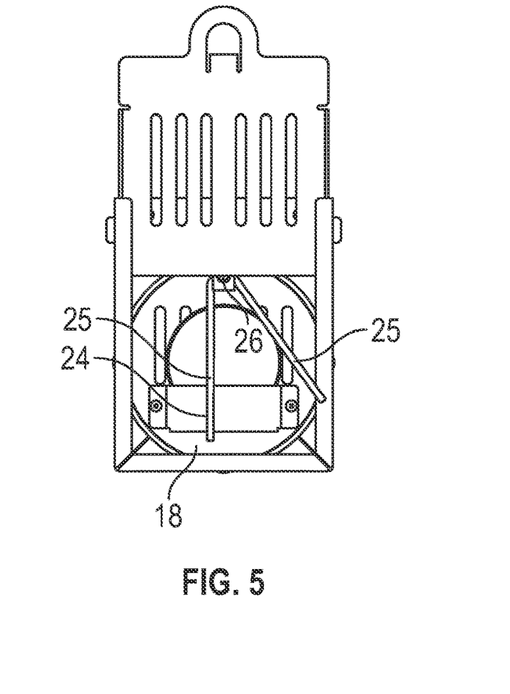
FIG. 5 is a view similar to FIG. 3, with the trigger moved to the left.

When the bait aroma attracts an animal, the animal can walk through the open front door 16 of the trap and continue rearwardly toward the bait, which is behind the trigger 24. When the animal engages either of the downwardly diverging trigger arms 25, the trigger will be pushed rearwardly such that the forward end of the rod 26 disengages the catch 32 to allow the door to drop by gravity to the closed position, or the arms 25 will be pushed laterally left or right by the animal, which will rotate the rod 26 out of engagement with the catch 32, such that the front door 16 will close. In the unlikely event that the animal gets past the trigger 24 without tripping their trap, there is a second opportunity for the trigger 24 to be tripped when the animal moves from the rear of the housing 12 and forwardly to push the trigger arms 25 left or right and thereby release the catch 32.

Thus, the trigger 24 can be actuated in three directions: rearward, left, or right. This three-way trigger action virtually assures that an animal will trip the trigger when moving to retrieve the bait in the rear of the trap 10. Alternatively, the trigger movement may be limited to left and right lateral movement, without forward or rearward longitudinal movement. When the trigger 24 is tripped, the front door 16 will slam shut, and cannot be pushed open by the animal inside the housing 12 since the edges of the door are retained in the tracks 20.

Figure 7:
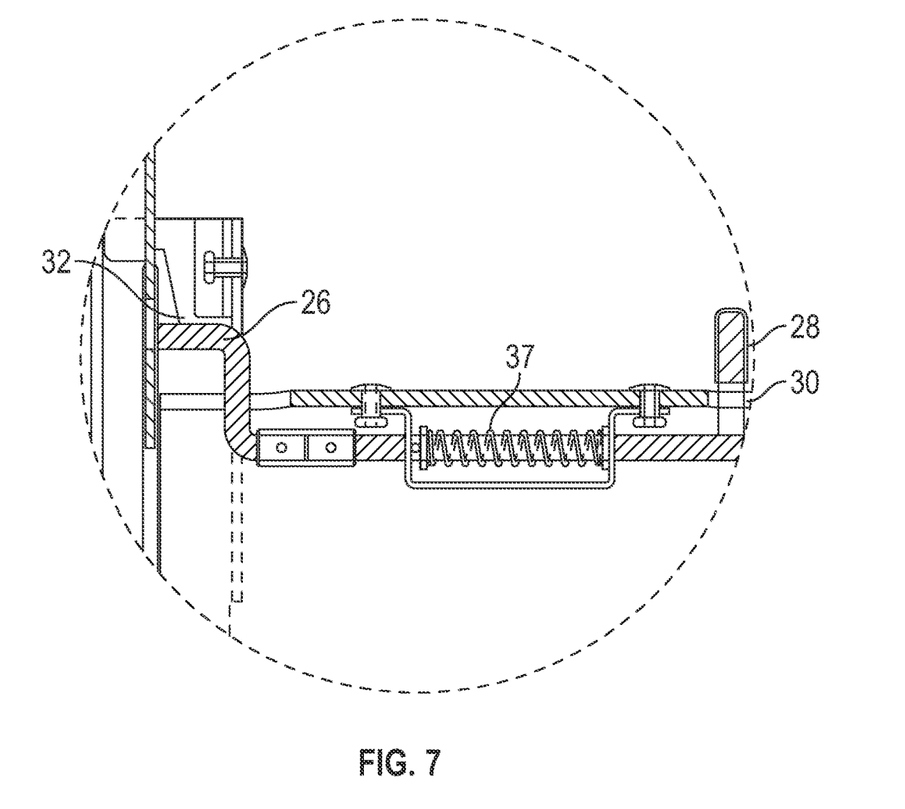
FIG. 7 is an enlarged view taken along line 7-7 of FIG. 6.
Figure 8:
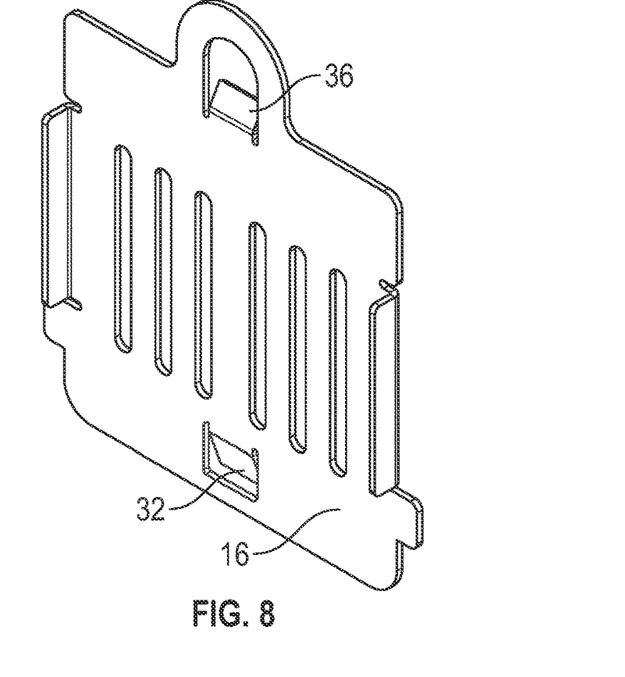
FIG. 8 is a perspective view of the front door of the first embodiment.
Figure 9:
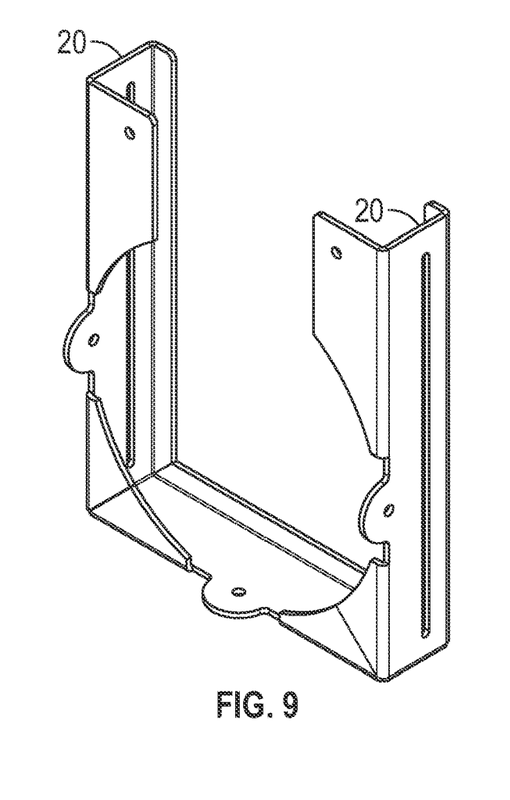
FIG. 9 is a perspective view of the guide track for the front door of the first embodiment.

The catch 32 is located on the inside surface of the front door 16, adjacent the bottom edge. When the door 16 is closed, the forward end of the rod 26 overlies a rearwardly extending tab 36 on the top edge of the door, to preclude the door from accidentally opening. The tab 36 is angled at approximately 45-degree angle, such that when the door drops from the opened position to the closed position, the tab 36 will push the rod 26 rearwardly. A spring 37 biases the rod 26 forwardly. A removable pin 38 may be provided to retain or lock the rear door 18 in the closed position.

Figure 13:
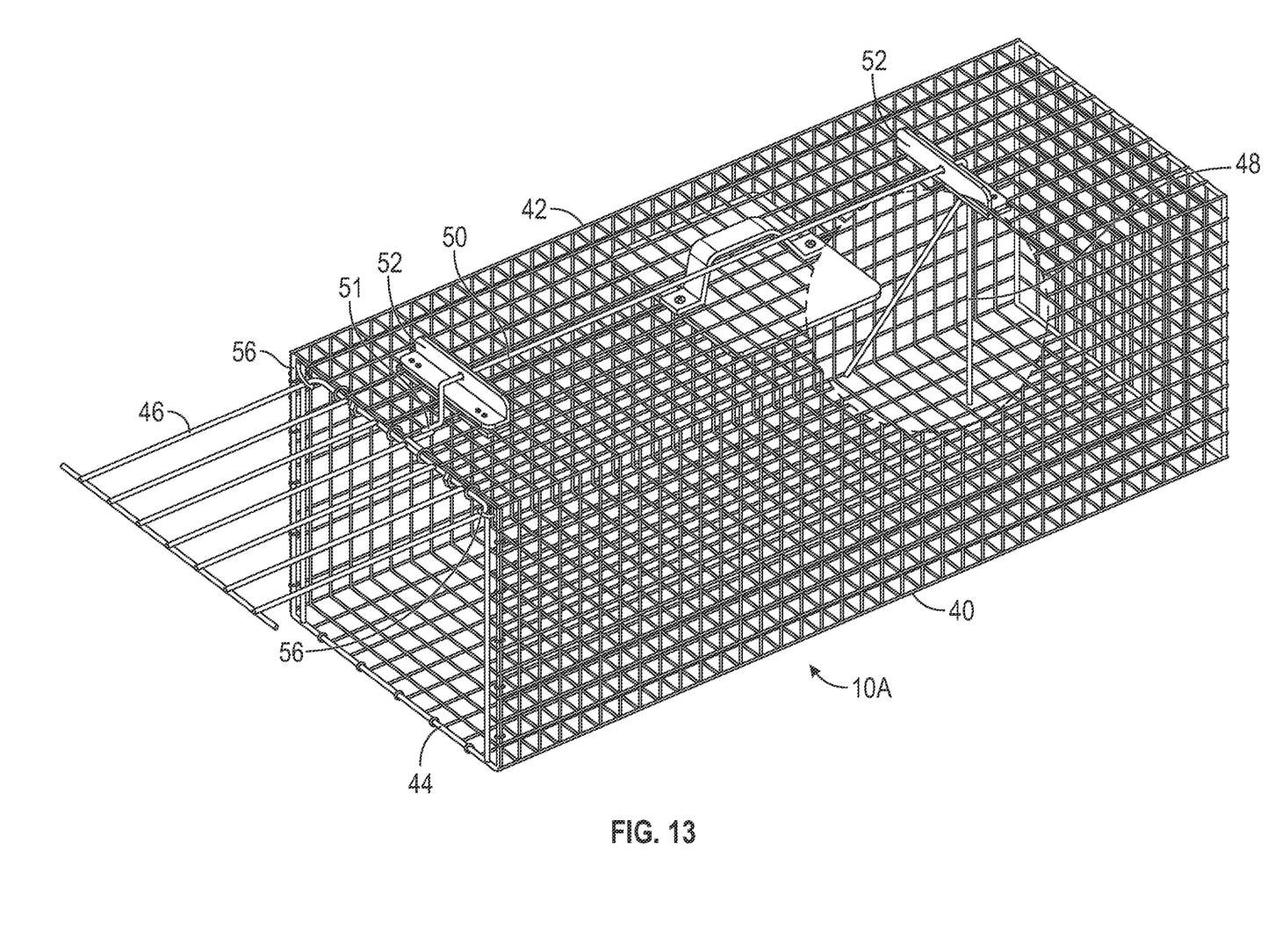
FIG. 13 is a perspective view of a second embodiment of the live animal trap according to the present invention, with the hinged front door in an open position.
Figure 14:
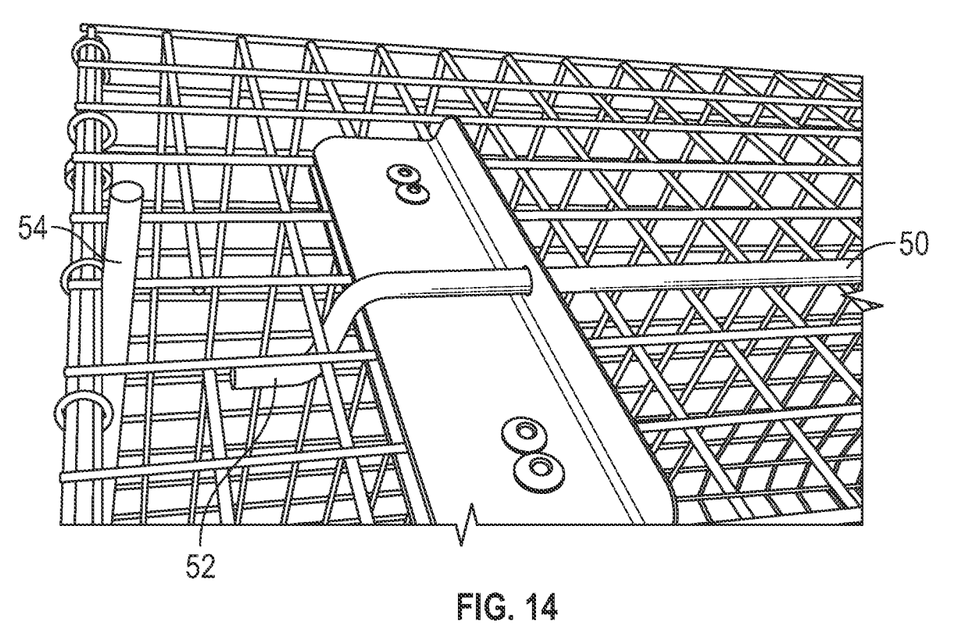
FIG. 14 is an enlarged view showing the latch components of the second embodiment with the front door in a closed position.
Figure 15:
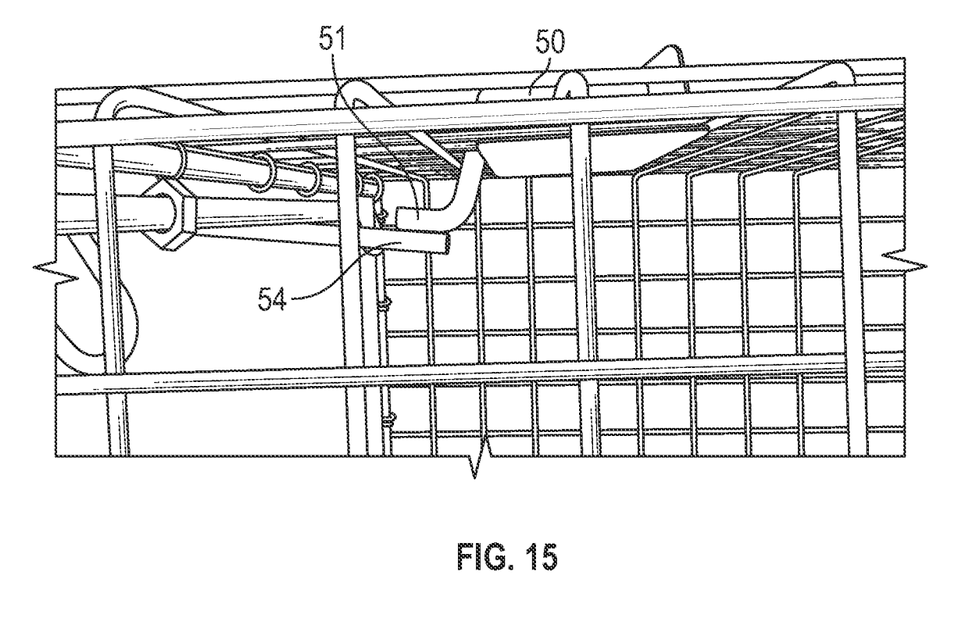
FIG. 15 is an enlarged view of the latch components of the second embodiment with the front door in an open, set position.

FIGS. 13-15 show an alternative embodiment of the animal trap 10A. The trap 10A is in the form of a wire cage, with opposite sidewalls 40, a top wall 42, and a bottom wall 44. A front door 46 is hinged to the top wall 42 so as to be movable between a lowered, closed position and a raised, open position. The door 46 extends substantially horizontally in the open position.

The wire cage trap 10A includes a trigger 48 with diverging fingers, similar to the trigger 24 of the trap 10. The trigger 48 is attached to a rod 50 which extends longitudinally on top of the top wall 42. Support plates 52 rotatably support the ends of the rod 50. The forward end 51 of the rod 50 has an L-shape so as to extend downwardly through the top wall 42, as seen in FIGS. 14 and 15.

The front door 46 includes a catch post 54 which extends upwardly beyond the top wall 42 when the door 46 is closed, as seen in FIG. 14. When the door 46 is opened, the post 54 extends rearwardly beneath the front end of the rod 50. When the trap 10A is set with the door 46 open, the rod tip 51 overlies the catch post 54, as seen in FIG. 15, to retain the door 46 in the open position. When an animal moves the fingers of the trigger 48 left or right, the rod 50 rotates about its axis to disengage the front tip 51 from the post 54, such that the door 46 falls by gravity to the closed position. The door is retained in the closed position by a pair of lock rings 56 which extend around the door and door frame as described in Applicant's copending patent application Ser. No. 15/199,062, published application 2017/0000105, which is incorporated herein by reference in its entirety. When the door is open, the rings 56 are at the upper corners of the door, and when the door is closed, the rings 56 are at the lower corners of the door. Thus, the lock rings 56 prevent an entrapped animal from pushing the door open and escaping from the trap 10A.

As seen in FIGS. 14 and 15, the rod tip 51 and the catch post 54 are round, which provides a sensitive set position for the trap 10A. If it is desired to make the trap 10A less sensitive, the surfaces of the tip 51 and/or the catch post 54 can be flat, or a rubber coating or sleeve can be provided on the tip 51 and/or the catch post 54 to increase the friction there between, thus making the trap 10A easier to set, without accidental tripping or release of the rod tip 51 from the catch post 54.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed:

1. A trap for catching and releasing animals, comprising: a housing having forward and rearward ends; a door on the forward end of the housing; a trigger assembly on the housing, and having a longitudinal rotational axis and a tip offset from the axis; a catch on the door which extends rearwardly to retentively engage the tip of the trigger assembly to hold the door open; and the trigger assembly being actuable in three different directions to disengage the tip from the catch upon movement of the trigger in each of the three different directions and thereby causing the door to close.

2. The trap of claim 1 wherein the three different directions include left and right lateral directions and a rearward direction.

3. The trap of claim 1 wherein the trigger assembly is movable in a longitudinal direction and in a lateral direction.

4. The trap of claim 1 wherein the trigger assembly is spring biased toward a set position.

5. The trap of claim 1 wherein the door slides up and down between open and closed positions.

6. The trap of claim 5 further comprising tracks for slidably receiving opposite lateral edges of the door.

7. The trap of claim 1 further comprising a finger on the trigger assembly extending through the housing so as to set the trigger assembly from outside the housing.

8. The trap of claim 1 further comprising a lock on the door engaged by the trigger assembly when the door is closed to lock the door against opening.

9. The trap of claim 1 wherein the trigger assembly has a pair of diverging fingers extending downwardly inside the housing.

10. The trap of claim 1 further comprising the door being hinged to the housing for pivotal movement between open and closed positions.

11. The trap of claim 1 wherein the trigger assembly includes a straight rod and the tip is bent from the rod.

12. The trap of claim 11 wherein the tip is on the forward end of the rod.

13. The trap of claim 1 wherein the tip is on the forward end of the trigger assembly.

14. The trap of claim 1 wherein the tip is formed by two bends in the trigger assembly.

15. The trap of claim 1 wherein the trigger assembly includes a rod and the tip is parallel to the rod and spaced upwardly from the rod.

* * * * *